United States Patent Office 2,712,577
Patented July 5, 1955

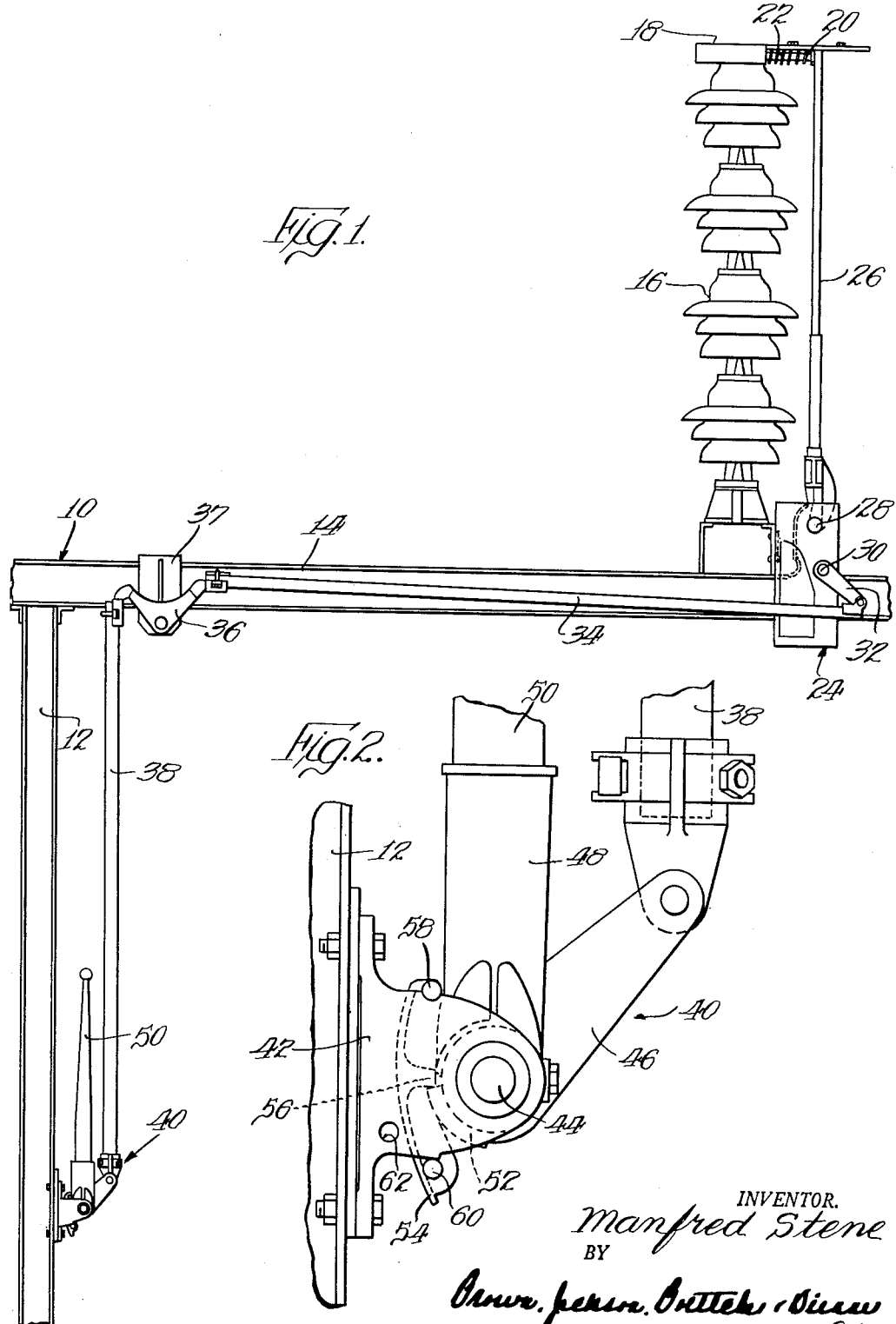

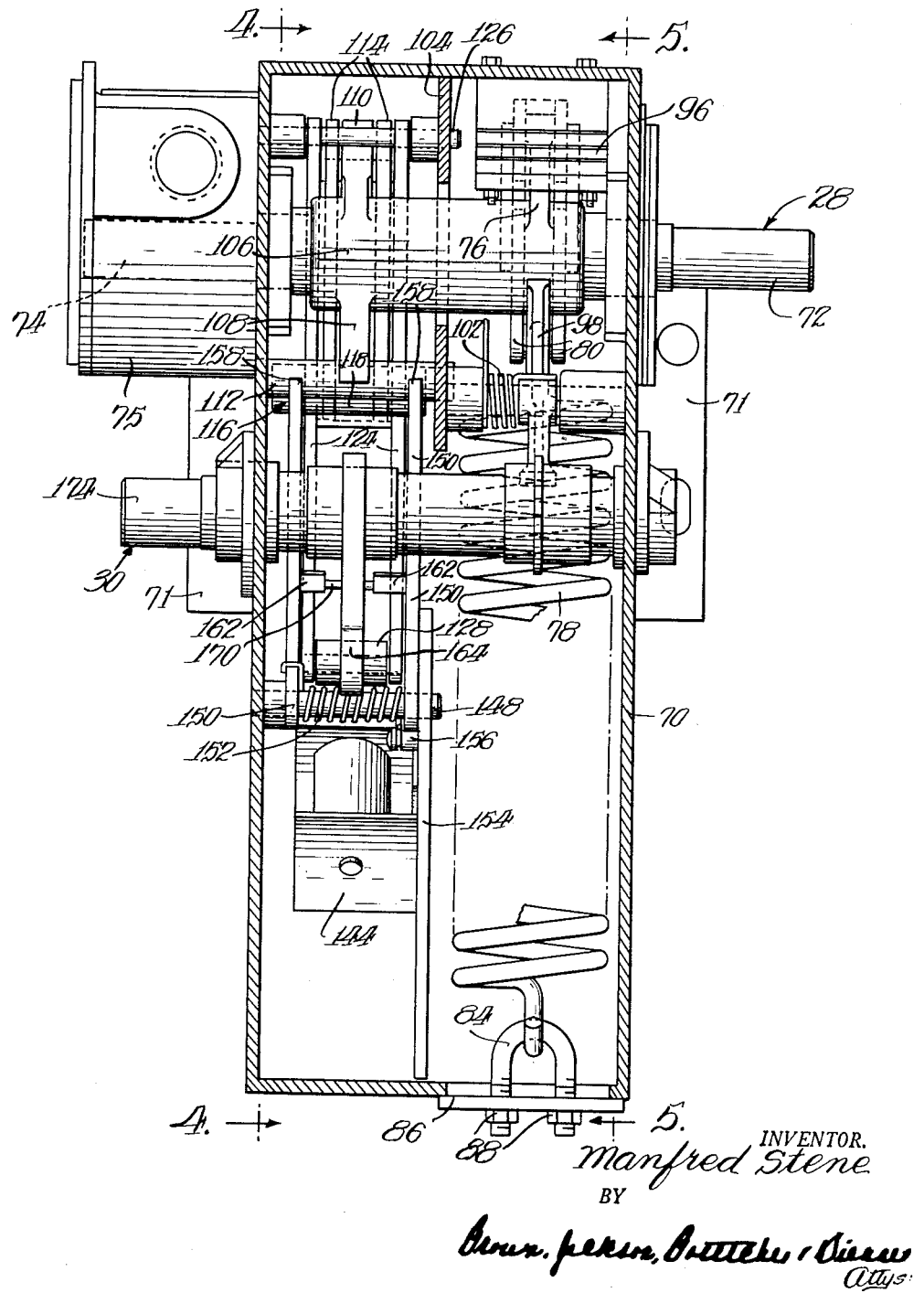

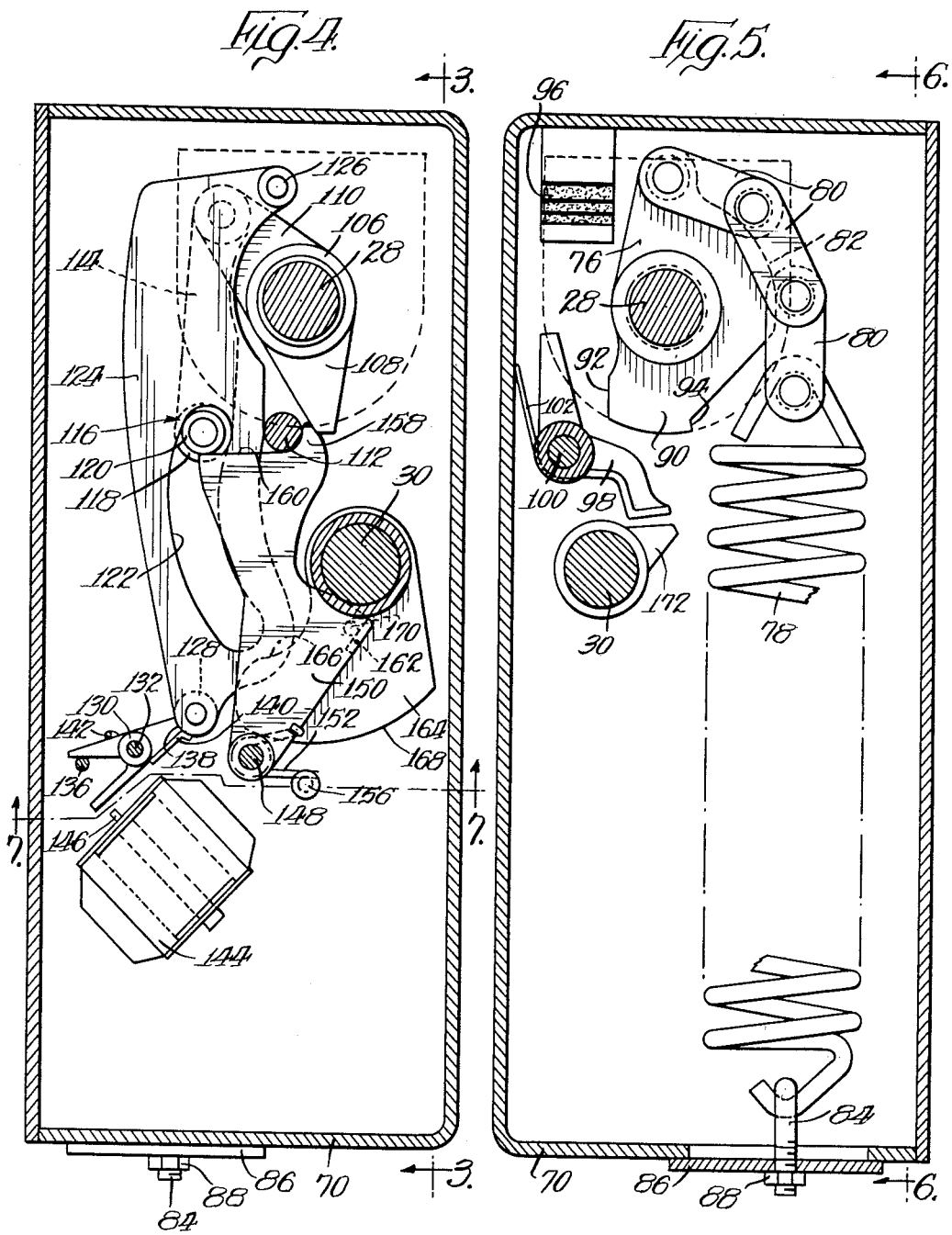

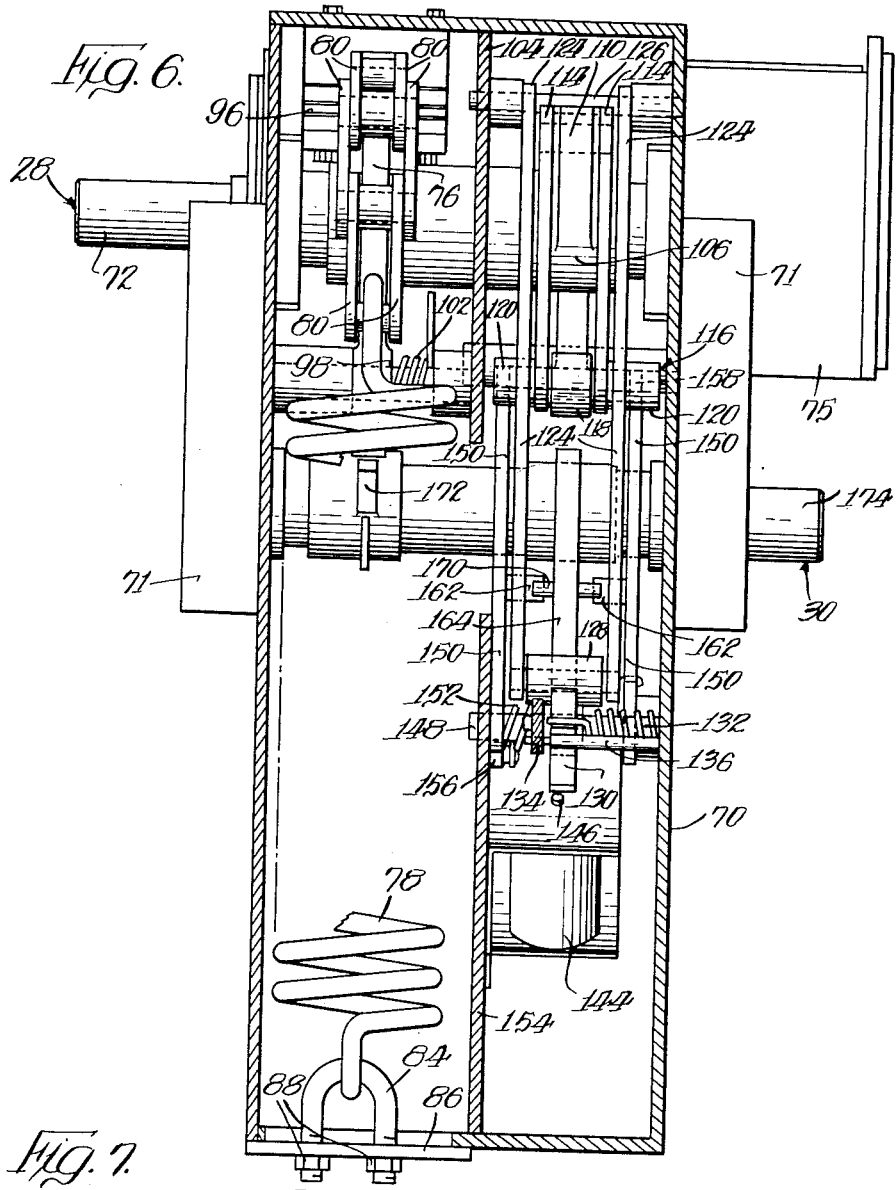

2,712,577

HIGH VOLTAGE HIGH SPEED SHORT-CIRCUITING SWITCH

Manfred Stene, Chicago, Ill., assignor, by mesne assignments, to H. K. Porter Company, Inc. of Pittsburgh, Philadelphia, Pa., a corporation of Pennsylvania Application August 9, 1952, Serial No. 303,460

13 Claims. (Cl. 200—89)

The present invention relates to high voltage, high speed, short-circuiting switches and to improved operating mechanisms for switches requiring rapid movement to their open or closed positions.

Short-circuiting switches are primarily used to impose a deliberate short circuit on a line supplying transformers in the event of a transformer fault; the purpose being to open power circuit breakers which supply the transformers through long transmission lines.

In power transmission installations, damage resulting from transformer faults increases very rapidly after an original transformer failure, yet the fault current in the line is so small that extensive damage may readily occur before sufficient current flows to be detected by circuit breaker actuating line protecting relays which must of necessity be adjusted to trip and actuate the circuit breaker only on fault currents greater than the maximum normal load current.

To detect transformer faults, differential relays which compare the input and output of the transformers may be used, in which case current transformers necessary to actuate the differential relays must be mounted on both the input and output side of the transformers. The use of differential relays eliminates the possibility of directly tripping breakers located at a distance from the transformers unless a carrier current or pilot wire arrangement be used which again entails very expensive equipment. As an alternative to the use of a carrier current or pilot wire arrangement and, also, to the use of more than one circuit breaker for a power transmission line, the present invention provides a high speed, short-circuiting switch adapted to be located near the transformers, which switch is adapted to be closed by the transformer differential relays so as to impose a fault on the line of sufficient magnitude to actuate the high speed overcurrent or ground relays located near the power circuit breaker, even though the circuit breaker be located at a considerable distance from the transformers.

It is necessary in power transmission lines to locate a power circuit breaker at the source of the line supplying power to the transformers in order to serve as a protection against line faults. The high speed short-circuiting switch of the present invention eliminates the need for a second breaker located near the transformers, and provides a means for utilizing the line power circuit breaker for clearing transformer faults as well as line faults.

It is an object of the present invention to provide improved high speed, short-circuiting switches and to provide improved automatic operating mechanism therefor.

It is also an object of the present invention to provide an improved automatic operating mechanism for switches that require rapid actuation either to their open or close positions.

Another object of the present invention is to provide an improved switch actuating mechanism comprising a spring loaded lever for actuating the switch blade, first latch means for holding the lever in spring loaded position, means for automatically and manually tripping the first latch means to release the spring for moving the switch blade, second latch means for holding the lever in spring released position to prevent switch blade rebound, and means for tripping the second latch means to accommodate resetting of the switch blade and reloading of the spring.

In accordance with the foregoing, I provide a switch actuating mechanism including a first shaft adapted to carry the switch blade, a lever mounted on the first shaft, a spring connected to the lever, a collapsible linkage associated with the first shaft, a latch for retaining the collapsible linkage, electrical means for tripping the latch to collapse the linkage to accommodate unloading of the spring, a second latch for retaining the lever in spring unloaded position, a second shaft adapted to be manually actuated, a trip on the second shaft for tripping the second latch, a reset member on the second shaft for resetting the collapsible linkage to reload the spring, and a trip member on the second shaft adapted to collapse the linkage.

A further object of the invention is the provision in switch actuating mechanism of the character briefly defined of spring means for exerting a tension load on the lever to apply a torque to the switch blade shaft rather than the provision of a conventional torsion spring encircling the shaft. The provision of a tension spring has the advantages of greatly reducing the maintenance and repair in devices of the character referred to.

A still further object of the invention is to provide a mechanism of the character briefly defined that is highly efficient in use and operation, is incorporated in an extremely compact unit and is economical in manufacture and assembly.

It is an additional object of the invention to provide improved short-circuiting switch means which means includes the operating mechanism of the present invention and wherein the switch blade is adapted to be moved at high speed to its closed position by means of the tension spring incorporated in the operating mechanism.

Other objects and advantages of the present invention will become apparent in the following detailed description of a preferred embodiment of the invention.

Now, in order to acquaint those skilled in the art with a manner of constructing and operating the switch means and switch operating mechanism of the present invention, I shall describe, in connection with the accompanying drawings, a preferred embodiment of the invention.

In the drawings, wherein like reference numerals refer to like parts:

Figure 1 is a side elevation of the improved short-circuiting switch of the present invention;

Figure 2 is a partial side elevation, on an enlarged scale, of means for manually actuating the switch and for locking the actuating means in switch open or closed positions;

Figure 3 is a vertical longitudinal sectional view of the improved switch operating mechanism of the present invention, the view being taken substantially on line 3—3 of Figure 4;

Figure 4 is a vertical cross-sectional view of the switch operating mechanism, the view being taken substantially on the line 4—4 of Figure 3;

Figure 5 is a vertical cross-sectional view of the switch operating mechanism, the view being taken substantially on the line 5—5 of Figure 3;

Figure 6 is a vertical longitudinal sectional view of the switch operating mechanism, the view being taken substantially on line 6—6 of Figure 5; and Figure 7 is a partial horizontal cross-sectional view of the switch operating mechanism, the view being taken substantially on line 7—7 of Figure 4.

Referring now to the drawings, particularly to Figure 1,

I have shown the short-circuiting switch of the present invention mounted on a supporting structure, indicated generally at 10, including a vertical beam 12 and a horizontal beam 14. On the horizontal beam 14, an insulator stack 16 is mounted which at its upper end carries the stationary contact 18 of the switch. The stationary contact 18 includes a contact rod 20 mounted for sliding movement and a buffer spring 22 normally urging the rod outwardly so as to cushion the closing movement of the switch blade. Mounted adjacent the base of the insulator stack 16 is a control or actuating mechanism, indicated generally at 24, which carries a switch blade 26 movable in an arc, preferably in excess of 90 degrees, adapted for circuit opening and closing movement with respect to the stationary contact 18 and the contact rod 20.

The control assembly 24, which will be explained in detail hereinafter, includes a switch blade or main shaft 28 and an actuating or drive shaft 30. The assembly also includes spring means biasing the switch blade toward engagement with the stationary contact 18, latch means for holding the blade at both extremes of its movement, means for manually tripping both latch means, means for automatically tripping the latch means holding the blade in switch open or horizontal position, and means for resetting the switch in open position when the same is closed. While the latter means and the means for manually tripping both latch means may take many forms, such for example as a remotely controlled motor suitably connected to the actuating shaft 30, a preferred manual actuating and resetting means is shown in Figure 1 as including a lever 32 secured to the actuating shaft 30, a horizontal rod 34 pivotally connected at one end to the lever 32 and at its other end to a bell crank lever 36 which is pivotally mounted on a bracket 37 mounted on the horizontal beam 14. A vertical rod 38 is pivotally connected at its upper end to the bell crank lever 36 and is connected at its lower end to a latch and lever assembly, indicated generally at 40.

The latch and lever assembly 40, is shown in detail, on an enlarged scale, in Figure 2 as comprising a base 42 adapted to be secured to the vertical beam 12 and providing a pivotal support for a pin or shaft 44. Secured to the shaft 44 is a first lever 46, to which the lower end of the rod 38 is pivotally connected, and a second lever 48 providing a socket adapted for the reception of a removable wooden handle 50. As will be apparent, movement of the second lever 48 by the removable handle 50 will effect movement of the first lever 46, the rod 38, the bell crank lever 36, the rod 34, the lever 32 and the actuating shaft 30 of the control mechanism 24. It is preferred that the lever 48 have approximately the same arc of movement as the switch blade 26. Also mounted on the shaft 44 and movable with the levers 46 and 48 is a cam member 52 defining abutments at the limits of rod movement. As will be apparent, the cam member 52 may be formed on either of the levers or may be formed separately thereof and secured to the shaft 44. The cam member 52 is adapted for cooperation with a latch 54 including a tab 56 adapted to engage the abutments of the cam 52 to retain the shaft 44 at either limit of its movement. The latch 54 is pivoted, as at 58, on the base 42 and includes a pin 60 engaging the edge of the base so as to retain the latch 54 on the base. To lock the latch 54 in position to retain the shaft 44 at either limit of its movement, holes 62 are provided in the base for the reception of a padlock, which when inserted in the hole 62 engages the rearward surface of the latch 54 so as to retain the latch in such position that the tab 56 projects into the path of movement of the cam 52.

The switch of the present invention is designed for fast or high speed closing movement and, to this end, the control assembly 24, includes a spring for rapidly moving the switch blade 26 to its closed position. To wind or tension the spring, the handle 50 is swung to a horizontal position to move the switch blade 26 to its horizontal position which effects tensioning of the spring. When the switch blade 26 is at its open limit of movement, the same is latched therein by the control means to be described hereinafter. The shaft 44 may then be locked in the position wherein the lever 48 is disposed in a horizontal position. Upon the occurrence of an electrical fault, as sensed by the differential relays disposed to either side of the transformer as referred to hereinbefore, suitable electrically responsive means included within the control assembly 24 is adapted to trip the latch retaining the switch blade in its open position so as to accommodate closing of the switch by means of the spring. The closing movement of the switch is rapidly accomplished by means of the spring and is cushioned by the spring 22 upon engagement of the switch blade 26 with the movable rod 20 of the stationary contact 18. When the switch blade 26 engages the stationary contact 18, suitable latch means within the control assembly 24 is adapted to latch the blade in its closed position so as to prevent rebound of the blade. To reset the switch blade in its open position, the latch 54 of the lever and latch assembly 40 is unlocked and the removable wooden handle 50 is inserted in the socket provided by the lever 48. The handle 50 is then moved to a vertical position and thereafter is returned to a horizontal position, upon which movement toward the horizontal position, the blade is opened and the spring is tensioned. To manually close the switch, it is merely necessary according to the mechanism provided by the present invention to move the handle 50 to its vertical position. When the handle is moved to its vertical position, the switch blade 26 is not moved until the handle 50 approaches the vertical limit, at which time suitable latch means within the control assembly 24 is tripped to release the switch blade and spring so that the switch blade may be moved in a snap action to its closed position by means of the spring. As will be apparent, the latch 54 may be locked so as to normally retain the switch blade in either its open or closed position, as may be desired.

Now turning to Figures 3 to 7, the control mechanism or assembly 24 for accomplishing actuation of the switch as pointed out hereinbefore will be described in detail. The control mechanism is disposed in a housing 70 in the opposite walls of which the shafts 28 and 30 are journalled for rotation, the shafts being mounted in spaced parallel relation. The housing includes a pair of attachment or mounting tabs 71 extending from opposite walls thereof by means of which the housing may be suitably connected to the base of the insulator stack 16. The switch blade shaft 28, which as pointed out is journalled within the walls of the housing 70, includes portions extending outwardly of the housing at each side thereof. One extending portion 72 of the shaft 28 provides a mounting for the switch blade 26 and the other extending portion 74 of the shaft is adapted for actuation of an auxiliary switch (not shown), adapted to be mounted in an auxiliary switch housing 75 associated or formed integrally with the housing 70. Within the housing 70, the switch blade shaft 28 carries a lever 76 to which a spring 78 is connected by means of a plurality of pivotally connected pairs of links 80. The spring 78 is a conventional helically coiled spring adapted to be stressed in tension so as to exert a load on the lever and thus a torque on the shaft 28. The spring is offset from the shaft 28 and the lever 76 is provided with an arcuate surface portion 82 on which the pivot pins of the links 80 engage to connect the lever and spring without distortion of the spring. As will be appreciated, the links 80 comprise a chain having effective radii arranged for most effective utilization of the spring energy so that there will be a uniform transmission of torque to the switch blade shaft 28. The spring 78 is mounted at its lower end by means of a U bolt 84 engaged with the spring and passed through and secured to a plate 86 which engages the bottom wall of the housing 70. An aperture is provided in the bottom wall of the housing to accommodate passage of the bolt 84 so that the bight portion of the bolt 84 may be engaged with the end loop of the spring. The U bolt 84 is associated by means of nuts 88 with the plate 86 so that adjustment between the plate and bolt may be made whereby the plate 86 will be held tightly to the bottom wall of the housing 70 by means of the spring 78.

To limit movement of the shaft 48 in its spring actuation direction of rotation, the lever 76 is provided, at a point opposite the connection of the links 80, with a portion 90 presenting a pair of spaced abutments 92 and 94. The abutment 92 is adapted to engage a cushioning member 96 mounted on the top wall of the housing to limit movement of the shaft. The cushioning member 96 preferably comprises outer metallic wear plates and a plurality of intermediately disposed layers of resilient material adapted to cushion the shock or impact of engagement of the abutment 92 therewith.

To hold the shaft 28 in its spring actuated position, that is, with the abutment 92 engaging the cushioning member 96, a latch 98 is pivotally mounted on a short shaft 100 supported within the housing. The latch 98 is generally L-shaped in form and the upper leg thereof is biased into the path of movement of the abutment portion 90 of the lever 76 by means of a coil spring 102 encircling the shaft 100. Accordingly, when the lever 76 is moved by the spring 78, the abutment portion 90 of the lever 76 moves the latch 98 out of the path of movement of the lever, but when the abutment 92 engages the cushioning member 96, the latch 98 is biased back into the path of movement of the lever by means of the spring 102 so that the upper end of the latch 98 engages the abutment 94 to hold the shaft 28 against rebound. The shaft 100 may be supported in the housing in any desired manner, but the housing 70 preferably includes a depending vertical partition 104, and the shaft 100 is mounted at its opposite ends in the partition 104 and one end wall of the housing 70. As will become more readily apparent as the description proceeds, the partition 104, together with other partition means, divides the housing 70 into two chambers or portions, one of which will be referred to for convenience as the actuating portion and the other of which will be referred to for convenience as the reset portion.

The lever 76 is disposed on the shaft 28 substantially centrally of the actuating portion of the housing. To the other side of the partition 104, the shaft carries a second lever 106 provided with substantially oppositely extending arms 108 and 110. If desired, the levers 76 and 106 may constitute a unitary member including a common hub and the two levers, or the two levers may be formed separately. The arm 108 of the second lever 106 is adapted to engage a pin 112 stationarily mounted in the housing to limit rotation of the shaft 28 in the direction of rotation opposite that during which the abutment 92 engages the cushioning member 96. Accordingly, the cushioning member 96 and the pin 112 define limits of movement of the switch blade shaft 28, which movement, as pointed out hereinbefore, is preferably slightly in excess of 90 degrees, preferably approximately 97 degrees. The other arm 110 of the lever 106 provides a pivotal mounting for one end of a pair of links 114 which are provided at the opposite or lower end thereof with a roller assembly indicated generally at 116. The roller assembly 116 includes a shaft extending between and supported by the two links 114, a large central roller 118 and a pair of smaller outside rollers 120 supported for rotation on the shaft. The rollers 120 are received within aligned arcuate slots 122 provided in a pair of plates 124, which plates comprise a carriage. The carriage 124 is pivotally mounted at its upper end by means of a pin 126 supported by one wall of the housing 70 and the partition 104. At the lower end of the carriage 124, the two plates thereof carry a pin extending therebetween upon which a roller 128 is mounted. The roller 128 is arranged for engagement by a latch 130 which is pivotally mounted on a pin 132. The pin 132 is supported in the housing 70 and in a second vertical partition 134. To one side of the pivot axis thereof, the latch 130 includes a pair of diverging legs between which is stationarily mounted a stop pin 136 for limiting movement of the latch in both directions. To the other side of its pivot axis, the latch 130 presents a flat end portion 138 and includes an extension 140 on the lower side thereof. The flat end portion 138 and the extension 140 of the latch 130 comprise a step or the like on which the roller 128 of the carriage 124 is adapted to rest, the flat end portion 138 of the latch preventing swinging movement of the carriage 124 away from the blade shaft 28. To normally bias the latch 130 to a position in which the same will latch the carriage in operable position, a torsion spring 142 is mounted on the pin 132 with one end thereof abutting against the stop pin 136 and the other end thereof against the latch 130. As will be appreciated, the latch 130 normally retains the carriage 124 in the position shown in Figure 4. To release the carriage for pivotal movement, a trip coil or solenoid 144 is provided, the solenoid including a movable armature 146 adapted to be moved upwardly upon energization of the coil to engage the lower leg of the latch 130 whereby the latch face 138 of the member 130 is moved out of the path of pivotal movement of the carriage 124. The purpose and full operation of the apparatus described will be pointed out in detail hereinafter.

Mounted adjacent the normal position of the roller 128 of the carriage 124 is a pin 148 adapted to provide a pivotal support for a latch member 150. The latch member 150 is normally biased toward the carriage 124 by a torsion spring 152 mounted on the pin 148, the pin 148 being supported by one wall of the housing 70 and a vertical partition 154 generally aligned with the vertical partition 104. The vertical partition 154 also supports a stud 156 against which one end of the torsion spring 152 abuts. To limit movement of the latch 150 toward the carriage 124, the latch is provided at the upper end thereof with a tongue portion 158 adapted to engage the pin 112. The latch member 150 comprises a pair of plates, each having the configuration shown in Figure 4, bridging the two plates of the carriage 124. At the upper end thereof, each plate of the latch means 150 is provided with a latch face 160 adapted to be moved into the path of the arcuate slots 122 provided in the carriage 124 when the carriage 124 is held in its operative position by the latch 130 to support the rollers 120, and thus the links 114 and the arm 110 of the lever 106, in elevated position, in which position the spring 78 is tensioned. Adjacent the rearward edge thereof, below the actuating or drive shaft 30, each plate of the latch means 150 is provided with a tab 162 extending into the space between the two plates.

The actuating shaft 30, in the reset portion of the housing 70, carries a reset member or cam 164 provided with a reset face 166 adapted to engage the central roller 118 of the assembly 116 carried by the links 114 and the lever 106. The reset member 164 also includes a cam surface 168 upon which the roller 118 is adapted to ride if the cam 164 is elevated and the latch 130 is tripped. The reset member or cam 164 carries a pin 170 adapted to engage the tabs 162 provided on the latch 150 upon movement of the reset member 164 in a counter-clockwise direction as viewed in Figure 4.

In the actuating portion of the housing 70, the actuating shaft 30 carries a trip member or second cam 172 adapted to engage the lower leg of the rebound preventing the latch 198 to trip the latch and release the main shaft 28 for rotation upon actuation of the drive shaft 30 in a direction to engage the roller 118 and move the roller assembly upwardly through the slots 122 provided in the carriage 124. If desired, the cam members 164 and 172 may comprise a unitary member having a common hub or the two cams may be formed separately. To the exterior of the housing, and preferably to the side thereof opposite that from which the portion 72 of the switch blade shaft extends, a portion 174 of the actuating shaft 30 is extended for attachment thereto of the actuating lever 32.

Having thus far described the particular apparatus employed in the preferred embodiment of my invention, it is to be pointed out that structural changes may be made in the various components without departing from the scope of the invention.

In use of the control mechanism shown in Figures 3 to 7 with a switch as shown in Figure 1, the operation is as follows:

In Figure 1, the switch is shown closed with the handle 50 disposed in vertical position. Upon downward movement of the handle 50, the actuating or drive shaft 30 will be moved clockwise, as is viewed in Figure 1, to impart a clockwise movement to the main shaft 28 and the blade 26. Figure 4 is a view taken in the same direction as Figure 1, but the parts, for clarity of disclosure, have not been shown in the position that the same would be in if the relation were such as shown in Figure 1. If the apparatus of Figure 1 were disposed according to the relationship of Figure 4, the switch blade 26 would be in its open position and the handle 50 of the actuating apparatus would be almost vertical, but not to its full position of upward movement.

To close the switch, considering Figures 1 and 4, continued upward movement of the handle 50 will impart a counter-clockwise movement to the actuating or drive shaft 30 of the control or actuating mechanism and the reset member 164 carried thereby. Upon such movement, the pin 170 carried by the cam 164 will engage the tabs 162 provided on the latch 150 to move the latch 150 clockwise above its pivot 148 to move the latch faces 160 out from beneath the rollers 120. As soon as the rollers 120 are freed from engagement of the latch faces 160, the spring 78, which has been previously loaded in tension, will exert a downward pull on the chain links 80 to rapidly move the lever 76 in a clockwise direction, as the lever is viewed in Figure 5, or a counter-clockwise direction as the main shaft 28 is viewed in Figure 4. Movement of the shaft 28 in a counter-clockwise direction as viewed in Figures 1 and 4, under the urge of the spring 78, will effect high speed movement of the switch blade 26 to its closed position. When the mechanism is actuated as described, the carriage 124 remains stationary, or in its operable position, due to the engagement of the latch 130 with the carriage. During such operation, it will be apparent that the rollers 120 ride within and are guided by the arcuate slots 122 provided in the carriage 124.

As the switch blade 26 moves into its closed position, the resulting impact is cushioned by the contact spring 22 and by engagement of the abutment face 92 of the lever 76 with the cushion member 96. Due to the resilient cushioning provided by the spring 22 and the member 96, it would normally be possible for the switch blade 26 to rebound and break contact which would be highly disadvantageous. To prevent the occurrence of such possibility, the latch 98 is provided, the upper leg of which, viewing Figure 5, will be moved by the spring 102 under the abutment face 94 to hold the lever 76, the shaft 28 and the switch blade 26 at their limit of movement, thus preventing rebound.

To open the switch, the handle 50 is moved downward to impart a clockwise movement to the shaft 30 and the reset member 164, as viewed in Figure 4, and to move the trip member or cam 172 counter-clockwise, as the trip member is viewed in Figure 5. Upon such movement, the trip member 172 engages the lower leg of the latch 98 to move the upper leg thereof out of the path of movement of the abutment portion 90 of the lever 76 thus releasing the shaft 28 for rotation. Upon continued movement of the shaft 30, the reset member 132 will eventually release the latch 98, at which time the abutment 94 will have been moved counter-clockwise beyond the latch 98 so that the lever 76 will be free to be rotated to the position shown in Figure 5. Immediately after the member 172 trips the latch 98, the reset surface 166 of the cam 164 will engage the central roller 118 of the roller assembly 116 and upon continued movement, clockwise as viewed in Figure 4, the cam member 164 will move the roller 118, the links 114 and the arm 110 of the lever 106 clockwise to effect opening movement of the switch blade 26. During such movement, the latch 150 is released and the spring 152 biases the latch toward the pin 112. However, upward movement of the rollers 120 within the slots 122 moves the latch 150 out of the path of movement of the rollers until the rollers clear the latch faces 160, at which time the spring 152 moves the latch 150 to bring the latch faces 160 under the rollers 120. Upward movement of the cam 164 and associated apparatus is limited by engagement of the arm 108 of the lever 106 with the stationary pin 112. Thereafter, the handle 50 may be released at which time the rollers 120 will rest upon the latch faces 160 of the latch member 150 to retain the blade in its open position. During the upward movement of the cam 164, the lever 76, as the same is viewed in Figure 5, is moved counter-clockwise to wind-up, reload, or retension the spring 78 to condition the same for high speed switch closing operation as has been described.

To close the switch manually, it is merely necessary to move the operating handle 50 upwardly to rotate the actuating shaft 28 in a counter-clockwise direction, as the same is viewed in Figure 4. During substantially the full portion of such movement, the only actuation is that of the shaft 28 and the cam members 164 and 172. The cam member 172 will not engage the latch 98 during said movement, but immediately adjacent the end of the stroke, the pin 170 carried by the reset member 164 engages the tabs 162 provided on the latch 150 to trip the latch 150 which will result in the hereinbefore described switch closing actuation.

As pointed out hereinbefore, the primary purpose of the switch of the present invention is to impose a substantial fault on the line upon the occurrence of small transformer faults so that the main power line circuit breakers will be actuated. To this end, differential relays, as referred to hereinbefore, are associated with the transformer to the input and output sides thereof and the differential relays are connected to the trip coil 144 of the control mechanism of the present invention. When a transformer fault occurs, an impulse is imparted to the coil 144 which results in upward movement of the armature 146 to trip the carriage holding latch 130. When the latch 130 is tripped, the side thrust exerted on the carriage 124 by the rollers 120 from the spring 78 will result in swinging the carriage 124 sideways to accommodate movement of the rollers 120 off of the latch surfaces 160 of the latch member 150. Upon such movement, the spring 78 moves the shaft 28 in blade closing direction and the rollers 120 move downwardly through the slots 122 provided in the carriage 124. During such actuation, the reset member 164 is disposed in its upper position, but the lateral movement of the rollers 120, accommodated by the links 114, results in such movement of the rollers 120 as to clear the reset surface 166 of the member 164 so that the rollers 120 ride upon the cam surface 168 of the member 164 to the lower end of the slots 122 provided in the carriage 124. Thus, the switch is automatically actuated to its closed position.

To open the switch and reset the mechanism after automatic tripping thereof, the actuating handle 50 is moved upwardly so as to move the reset or cam member 164 in a counter-clockwise direction, as the member is viewed in Figure 4. When the cam surface 168 of the reset member 164 clears the rollers 120, the carriage 124 gravitates back to its normal position. The spring 142 lightly biases the latch 130 so that the carriage 124 can readily gravitate to its normal position, after which the latch 130 is returned to its normal position to retain the carriage 124 in its operable position. Since the latch 130 is required to resist only the lateral thrust exerted on the carriage 124 from the spring 78, the spring 142 biasing the latch 130 need not be strong. After the carriage 124 has gravitated to its normal position and is latched therein, the cam member 164 may be moved in a switch opening direction by moving the actuating handle 50 downwardly, which will result in the resetting action described hereinbefore, unless the transformer fault has not been cleared in which case the latch 130 will remain tripped so as to render it impossible for the rollers 120 to catch on the latch surfaces 160 of the latch member 150. Thus, as the actuating handle 50 approaches its horizontal position, the switch will again be snapped closed. When the fault has been corrected, it will be appreciated that the latch 130 will hold the carriage 124 against lateral movement so that normal resetting of the switch actuating mechanism will result.

From the foregoing, it will be appreciated that the present invention provides an improved short-circuiting switch and improved mechanism for controlling the operation or actuation of the switch. While specific terms have been applied to the various components of the apparatus of the present invention hereinbefore, it will be appreciated that various components need not take exactly the shape shown and described and that considerable variation in design may be resorted to without departing from the basic operating features provided by the present invention. For example, it may be stated that the lever 106, the links 114, the roller assembly 116 and the carriage 124 comprise a collapsible linkage for establishing one-way driving connection between the drive or actuating shaft 30 and the switch blade or main shaft 28. The collapsible linkage is held in operable position by means of a pair of latches 130 and 150 and is adapted to be collapsed to release the main shaft 28 for spring actuated rotation when either of the latches is tripped. Likewise, while the operating or actuating mechanism of the present invention has been described herein as applied specifically to the short-circuiting switch of the present invention, it will be appreciated that the mechanism is capable of use with other switch applications. By providing a tension loaded spring, the present invention provides a switch operating mechanism that is of relatively small size and compact in nature. The force exertion of the spring is large, but the particular mechanism employed for tensioning the spring provides a force multiplication so as to render it easy to load or tension the spring. In addition, it will be appreciated from the foregoing that the present invention provides switch apparatus and operating mechanism therefor that is economical of manufacture and assembly.

While I have described what I regard to be a preferred embodiment of my invention, it will be appreciated by those skilled in the art that certain modifications, variations and rearrangements may be made in the preferred embodiment without departing from the scope of the invention, as defined by the appended claims.

I claim:

1. A high voltage short-circuiting switch comprising a stationary contact, a switch blade adapted to engage said contact, a shaft supporting said blade for movement in an arc toward and away from said contact, a lever secured to said shaft, a spring connected to said lever adapted when loaded to move said lever and rotate said shaft in a direction to engage said blade with said contact, means for rotating said shaft to move said blade away from said contact and to load said spring, collapsible latch means for retaining said lever, said shaft and said blade in spring loaded position, said means including a member for manually tripping said latch means, electrical fault responsive means for tripping said latch means, said latch means when tripped releasing said shaft for high speed switch closing rotation under the actuation of said spring, and second latch means engageable with said lever when said blade engages said contact to prevent rebound of said lever, said shaft, and said blade.

2. A high voltage short-circuiting switch for power line installations including a transformer, differential relays to the input and output sides of the transformer, and a circuit breaker located remotely of the transformer, the short circuiting switch being included in the installation adjacent the transformer and comprising, a stationary contact, a switch blade movable toward and away from said contact to open and close the switch, said switch when closed short-circuiting the power line to induce circuit breaker operation, a shaft supporting said blade for switch opening and closing movement, a spring loaded lever carried by said shaft for moving said shaft and said blade in switch closing direction, a second shaft, means carried by said shaft for establishing one-way driving connection between said second shaft and said blade supporting shaft, a linkage connected to said second shaft for oscillating said second shaft, a lever movable in an arc corresponding to the arc of switch blade movement for actuating said linkage, means for locking said lever at each limit of its movement, said lever when moved in one direction effecting rotation of said second shaft in a direction to establish driving connection with said blade supporting shaft to rotate the latter shaft and said blade in switch opening direction and to spring load the lever carried by the shaft, collapsible latch means associated with said means establishing driving connection between the two shafts for latching said blade supporting shaft in switch-open spring-loaded position adjacent one limit of movement of said lever, a member carried by said second shaft adapted upon movement of said lever toward its other limit of movement to trip said latch means, coil means adapted for energization by the transformer differential relays, and a trip member adapted for actuation upon energization of said coil means for tripping said latch means, said latch means when tripped releasing said blade supporting shaft and said blade for high speed switch closing movement under actuation of said spring loaded lever.

3. An actuating mechanism for switches having a stationary contact and a movable switch blade, comprising a spring loaded lever for actuating the switch blade in one direction, first latch means for holding said lever in spring loaded position, means for manually tripping said first latch means, electrically responsive means for tripping said first latch means, said first latch means when tripped releasing said lever for spring actuation, second latch means for holding said lever in spring released position to prevent switch blade rebound, and means for first tripping said second latch to release said lever and then resetting and reloading said lever, said first latch means automatically being relatched upon resetting of said lever.

4. An operating mechanism for switches comprising a spring loaded lever, a linkage operatively associated with said lever, a driving cam for driving said linkage to move said lever to spring loaded position, a first latch adapted to hold said lever in spring loaded position, electrical coil means for tripping said first latch, a second latch adapted to hold said lever in spring released position, and a second cam connected to said driving cam for tripping said second latch prior to driving engagement between said driving cam and said linkage.

5. An operating mechanism for switches comprising a spring loaded lever, a collapsible linkage operatively associated with said lever, a first latch adapted to hold said linkage in operable position, a driving cam for driving said linkage to move said lever to spring loaded position, a second latch adapted to hold said lever in spring loaded position, electrical coil means for tripping said first latch, said driving cam including a member for tripping said second latch, a third latch adapted to hold said lever in spring released position, and a second cam connected to said driving cam for tripping said third latch prior to driving engagement between said driving cam and said linkage.

6. An operating mechanism for switches comprising a spring loaded lever, a collapsible linkage operatively associated with said lever, a driving cam for driving said linkage to move said lever to spring loaded position, a pair of latches adapted to hold said linkage in operable position and said lever in spring loaded position, electrical coil means for tripping one of said latches, said driving cam including a member for tripping the other of said latches, said collapsible linkage being released upon tripping of either of said latches to release said lever for spring actuated movement, a third latch adapted to hold said lever in spring released position to prevent rebound of said lever, and a second cam connected to said driving cam for tripping said third latch prior to the establishment of driving engagement between said driving cam and said linkage.

7. A switch operating mechanism comprising a rotatable drive shaft, a rotatable main shaft adapted to support a switch blade, a collapsible linkage for establishing a drive connection between said drive shaft and said main shaft, a release latch adapted to hold said linkage in operable position, a trip coil adapted upon energization to trip said release latch to accommodate collapsing of said linkage, a second latch associated with said linkage to hold said shaft in a predetermined position, said linkage upon collapsing accommodating rotation of said main shaft, a third latch adapted positively to lock said main shaft in a second predetermined position after collapsing of said linkage, and means for tripping said third latch to accommodate movement of said main shaft by said drive shaft and said linkage.

8. A switch comprising a stationary contact, a movable switch blade, a rotatable drive shaft, a rotatable main shaft adapted to support said switch blade, a collapsible linkage for establishing a one-way driving connection between said drive shaft and said main shaft, a release latch adapted to hold said linkage in operable position, a trip coil adapted upon energization to trip said release latch to accommodate collapsing of said linkage, a second latch associated with said linkage for holding said main shaft in switch-open position, said linkage upon collapsing accommodating rotation of said main shaft to switch-closed position, a third latch adapted positively to lock said main shaft in switch-closed position, means carried by said drive shaft for tripping said third latch to accommodate movement of said main shaft to switch-open position by said drive shaft and said linkage, and means carried by said drive shaft for tripping said second latch.

9. A switch operating mechanism comprising a housing, a pair of shafts journalled in said housing in spaced parallel relation, each of said shafts having a portion extending exteriorly of said housing, one of said shafts being adapted for actuation by means of the extending portion thereof, the other of said shafts being adapted to carry a switch blade on the extending portion thereof, a lever mounted on said other shaft, a spring connected to said lever at one end and to said housing at its other end, a cam mounted on said one shaft, a collapsible linkage supported in said housing and having connection with said other shaft, said cam being adapted upon rotation of said one shaft in one direction to impart rotation to said other shaft through said linkage, movement of said lever upon rotation of said one shaft in said one direction resulting in tensioning of said spring, a first latch adapted to hold said linkage in operable position, a second latch adapted to hold said other shaft in spring tensioned position when said linkage is in operable position, a trip coil for tripping said first latch, a trip member carried by said one shaft, said trip member and said second latch being so constructed and arranged that said trip member is adapted to trip said second latch after predetermined rotation of said one shaft in the other direction, said other shaft upon tripping of either of said latches being released for spring actuated rotation.

10. A switch operating mechanism comprising a housing, a pair of shafts journalled in said housing in spaced parallel relation, each of said shafts having a portion extending exteriorly of said housing, one of said shafts being adapted for actuation by means of the extending portion thereof, the other of said shafts being adapted to carry a switch blade on the extending portion thereof, a lever mounted on said other shaft, a spring connected to said lever at one end and to said housing at its other end, a cam mounted on said one shaft, a collapsible linkage supported in said housing and having connection with said other shaft, said cam being adapted upon rotation of said one shaft in one direction to impart rotation to said other shaft through said linkage, movement of said lever upon rotation of said one shaft in said one direction resulting in tensioning of said spring, a first latch adapted to hold said linkage in operable position, a second latch adapted to hold said other shaft in spring tensioned position when said linkage is in operable position, a trip coil for tripping said first latch, a trip member carried by said one shaft, said trip member and said second latch being so constructed and arranged that said trip member is adapted to trip said second latch after a predetermined rotation of said one shaft in the other direction, said other shaft upon tripping of either of said latches being released for spring actuated rotation, an abutment disposed for engagement by said lever for limiting spring actuated rotation of said other shaft, a third latch adapted to hold said other shaft in spring released position with said lever adjacent said abutment, and a second trip member carried by said one shaft for tripping said third latch upon initial movement of said one shaft in said one direction.

11. A switch operating mechanism comprising a housing, a pair of shafts journalled in said housing in spaced parallel relation, each of said shafts having a portion extending exteriorly of said housing, one of said shafts being adapted for actuation by means of the extending portion thereof, the other of said shafts being adapted to carry a switch blade on the extending portion thereof, a lever mounted on said other shaft, a spring connected to said lever at one end and to said housing at its other end, a cam mounted on said one shaft, a carriage pivotally mounted on said housing and providing a guide, a linkage connected to said other shaft and having a free end associated with said carriage to be guided thereby, said cam being adapted upon rotation of said one shaft in one direction to impart rotation to said other shaft through said linkage, movement of said lever upon rotation of said one shaft in said one direction resulting in tensioning of said spring, a first latch adapted to hold said carriage in operable position, a second latch adapted to hold said linkage in position to maintain the tension load on said spring when said carriage is in operable position, a trip coil for tripping said first latch, a trip member carried by said one shaft, said trip member and said second latch being so constructed and arranged that said trip member is adapted to trip said second latch after a predetermined rotation of said one shaft in the other direction, said other shaft upon tripping of either of said latches being released for spring actuated rotation.

12. A switch operating mechanism comprising a housing, a pair of shafts journalled in said housing in spaced parallel relation, each of said shafts having a portion extending exteriorly of said housing, one of said shafts being adapted for actuation by means of the extending portion thereof, the other of said shafts being adapted to carry a switch blade on the extending portion thereof, a lever mounted on said other shaft, a spring connected to said lever at one end and to said housing at its other end, a cam mounted on said one shaft, a carriage pivotally mounted on said housing and providing a guide, a linkage connected to said other shaft and having a free end associated with said carriage to be guided thereby, said cam being adapted upon rotation of said one shaft in one direction to impart rotation to said other shaft through said linkage, movement of said lever upon rotation of said one shaft in said one direction resulting in tensioning of said spring, a first latch adapted to hold said carriage in operable position, a second latch adapted to hold said linkage in position to maintain the tension load on said spring when said carriage is in operable position, a trip coil for tripping said first latch, a trip member carried by said one shaft, said trip member and said second latch being so constructed and arranged that said trip member is adapted to trip said second latch after a predetermined rotation of said one shaft in the other direction, said other shaft upon tripping of either of said latches being released for spring actuated rotation, a cushioning member disposed for engagement by said lever for limiting spring actuated rotation of said other shaft, a third latch adapted to hold said other shaft in spring released position with said lever adjacent said cushioning member, said third latch preventing rebound of said lever, and a second trip member carried by said one shaft for tripping said third latch upon initial movement of said one shaft in said one direction.

13. A switch comprising a stationary insulator stack, a stationary contact carried by said stack, a housing mounted on said stack in spaced relation to said contact, a main shaft journalled in said housing, said main shaft including a portion extending exteriorly of said housing, a switch blade mounted on said portion of said main shaft for movement in an arc toward and away from said stationary contact, a drive shaft journalled in said housing in spaced parallel relation to said main shaft, said drive shaft having a portion extending exteriorly of said housing for actuation by means of the extending portion thereof, a lever mounted on said main shaft, a spring connected to said lever at one end and to said housing at its other end, a cam mounted on said drive shaft, a carriage pivotally mounted in said housing and providing a guide, a linkage connected to said main shaft and having its free end associated with said carriage to be guided thereby, said cam being adapted upon rotation of said drive shaft in one direction to impart rotation to said main shaft through said linkage, movement of said lever upon rotation of said drive shaft in said one direction resulting in movement of switch blade to open position and in tensioning of said spring, a first latch adapted to hold said carriage in operable position, a second latch adapted to hold said linkage in position to maintain said switch blade in open position and to maintain the tension load on said spring when said carriage is in operable position, a trip coil for tripping said first latch, a trip member carried by said drive shaft, said trip member and said second latch being so constructed and arranged that said trip member is adapted to trip said second latch after a predetermined rotation of said drive shaft in the other direction, said main shaft upon tripping of either of said latches being released for spring actuated rotation to move said switch blade at high speed into engagement with said stationary contact, a member disposed for engagement by said lever for limiting spring actuated rotation of said main shaft and for cushioning engagement of said stationary contact by said switch blade, a third latch adapted to hold said main shaft in spring released position with said lever adjacent said cushioning member to prevent rebound of said switch blade with respect to said stationary contact, and a second trip member carried by said drive shaft for tripping said third latch upon initial movement of said drive shaft in switch opening direction.

References Cited in the file of this patent

UNITED STATES PATENTS

| 768,584 | Canfield | Aug. 30, 1904 |
| 1,882,674 | Rowley | Oct. 18, 1932 |
| 1,950,022 | Davis | Mar. 6, 1934 |
| 2,138,316 | Wall | Nov. 29, 1938 |
| 2,145,140 | Starr | Jan. 24, 1939 |

FOREIGN PATENTS

| 13,590 | Great Britain | Nov. 23, 1905 |
| 233,757 | Great Britain | May 5, 1925 |